United States Patent
Fercher

(10) Patent No.: US 6,377,349 B1
(45) Date of Patent: Apr. 23, 2002

(54) ARRANGEMENT FOR SPECTRAL INTERFEROMETRIC OPTICAL TOMOGRAPHY AND SURFACE PROFILE MEASUREMENT

(75) Inventor: Adolf Friedrich Fercher, Vienna (AT)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/281,389

(22) Filed: Mar. 30, 1999

(30) Foreign Application Priority Data

Mar. 30, 1998 (DE) .......................................... 198 14 057

(51) Int. Cl.$^7$ ................................................. G01B 9/02
(52) U.S. Cl. ....................................... 356/450; 356/479
(58) Field of Search ................................. 356/451, 452, 356/454, 455, 456, 504

(56) References Cited

U.S. PATENT DOCUMENTS 5,565,986 A * 10/1996 Knuttel ....................... 356/345
5,877,856 A * 3/1999 Fercher ....................... 356/345

* cited by examiner

Primary Examiner—Frank G. Font
Assistant Examiner—Andrew H. Lee
(74) Attorney, Agent, or Firm—Reed Smith LLP

(57) ABSTRACT

An arrangement is provided for optical surface profile measurement and for obtaining optical sectional images of transparent, partially transparent and opaque objects by the spectral interferometric OCT method. In the spectral interferometric OCT method, the depth position of the object locations from which light is diffusely reflected is given by the light diffusely reflected by the object through a Fourier transform. Because of the path difference between the object light and reference light which is required for this purpose, large spatial frequencies occur in the spectrum which impair the resolution capacity of this method. According to the invention, the reference light is used to measure the phase of the wavelength spectrum by use of discrete phase displacements from the measured spectral intensities. This is also possible when the path difference between the object light and reference light is zero and a worsening of resolution therefore does not occur in this case.

1 Claim, 2 Drawing Sheets

ARRANGEMENT FOR SPECTRAL INTERFEROMETRIC OPTICAL TOMOGRAPHY AND SURFACE PROFILE MEASUREMENT

BACKGROUND OF THE INVENTION a) Field of the Invention

This invention is directed to an arrangement for optical surface profile measurement and for obtaining optical sectional images of transparent, partially transparent and opaque objects. An arrangement of this kind can be used in many areas. Currently, an arrangement of this kind appears to have considerable value above all in medicine, but is not limited thereto.

b) Description of the Related Art

Two fundamental optical-tomographic methods were developed in the nineteen-nineties. In optical scattered light tomography, absorption coefficients and scattering coefficients of the object area to be imaged are determined from the characteristic influence of light beams which pass through the object area to be imaged such that they are repeatedly scattered. This method provides images with poor spatial resolution. The second method, optical coherence tomography (generally referred to as OCT), is based on coherence characteristics of light and delivers high-resolution images (D. Huang; E. A. Swanson; C. P. Lin; J. S. Schuman; W. G. Stinson; W. Chang; M. R. Hee; T. Flotte; K. Gregory; C. A. Puliafito; J. G. Fujimoto: Optical coherence tomography, Science, 254 (1991), pages 1178–1181).

Actually, OCT should really be called "optical short-coherence tomography" because it involves the use of short coherent light, that is, light with a distinct spectral width and therefore short time coherence. In OCT, the object is scanned point by point along a line extending on the object surface in the x-direction by the measurement beam of an interferometer. Under every surface point the measurement beam also penetrates into the object (in the z-direction) and the diffusely reflected light is interfered with the reference beam of the interferometer. Interference occurs because of the use of short coherence light only when the measurement beam and reference beam have the same path length within the coherence length. Through continuous traversing of the measurement distance with the reference mirror, the depth position z and light scattering intensity of the locations diffusely reflecting the light are recorded under every surface point in the measured object. This can also be referred to as an "optical A-scan" in analogy to the more familiar ultrasound method (it differs from ultrasound, however, in that the ultrasound A-scan gives the depth position of the reflection locations of sound echoes based on the transit time from the interior of the object, whereas in OCT the depth position is determined by way of the path length balance between the measurement beam and reference beam which is required for interference.) Finally, the OCT tomogram is compiled line by line from many optical A-scans which are offset relative to one another in the x-direction.

In the meantime, OCT has become a successful diagnostic method, especially in ophthalmology. However, a disadvantage in the original OCT process consists in that the reference mirror must be moved mechanically. This is a source of wear and limits the image acquisition speed.

An alternative to the optical A-scan described above is the spectral interferometric method. In this method, the depth position z of the object locations which diffusely reflect the light is determined from the wavelength spectrum of the diffusely reflected light as is described in L. M. Smith and C. C. Dobson, Applied Optics, 1989, vol. 28, no. 15, pages 3339–3342. This process also forms the basis for the Austrian Patent Application A216/93-1 and the German Application DE 43 09 056 A1. The optical A-scan is obtained in this case by a Fourier transform of the spectral intensity distribution of the light diffusely reflected by the object.

In this last method described above, the spectrum of the light diffusely reflected by the object is obtained, for example, by a diode array in the spectrometer plane. However, direct application of the Fourier transform does not give the actual A-scan, but rather the autocorrelation function of the A-scan [the strict reasons for this are given, for example, in A. F. Fercher, C. K. Hitzenberger, G. Kamp, S. Y. El-Zaiat: Measurement of Intraocular Distances by BackscatteringSpectral Interferometry, Opt. Commun. 117 (1995) 43–48]. The physical basis for his consists in the fact that the diode array records the light diffusely reflected by he object only with respect to its wavelength-dependent intensity (or the square root thereof, which is the amplitude), but the phase is expressly ignored. In order to gain access to the phase as well, a reference wave with a path difference relative to the object that exceeds the object depth is required. However, this leads to a considerable increase in the spatial frequencies in the spectrum which must also be resolved by the diode array. Thus, in this case, a part of the available resolution capacity of the diode array must be used simply to register the phase without increasing the resolution of the imaging. However, since the resolution of this OCT process is determined by the resolution of the available diode array, this causes an unnecessary limitation of the resolution of the OCT images.

In contrast, the arrangement according to the invention also uses a reference wave, but in such a way that no additional demands are placed on the resolution capacity of the diode array.

The arrangement according to the invention is based on a process described in the literature (in: Fercher, A. F.; Hitzenberger, C. K.; Kamp, G.; El-Zaiat, S. Y.: Measurement of Intraocular Distances by Backscattering Spectral Interferometry, Opt. Commun. 117 (1995) 43–48) according to which the distribution of the light-scattering locations in the z-direction along the measurement beam—or, more strictly speaking, the scattering potential F(z)—is obtained through Fourier transformation of the complex spectral amplitude, that is, from spectral amplitude amount $A(\lambda)$ and spectral phase $\phi(\lambda)$ of the diffusely reflected light beam. That is, the amplitude and phase must be measured in the diffusely reflected light for the used wavelengths. For this purpose, a reference beam is also used in the process according to the invention; however, this reference beam requires no additional path difference relative to the object light. The reference beam is changed in phase by discrete steps and the amplitude and phase of the object light are determined from the associated spectral intensities in the interferogram. Phase measurement methods of this type are described in prior art digital interferometry and, for example, in the textbook "Optical Interferometry", P. Hariharan, Academic Press 1985, ISBN 0 12 325220 2.

OBJECT AND SUMMARY OF THE INVENTION

A primary object of the present invention, then, is to overcome the disadvantages of the OCT method which uses a reference wave, but which places no additional demands on the resolution capacity of the diode array.

Therefore, the arrangement according to the invention substantially comprises an illumination beam which illuminates the measurement object, a spectrometer grating or a spectrometer prism or prisms which spectrally separate the object light diffusely reflected by the measurement object, a reference beam which can be varied by steps with respect to phase relative to the object beam and which is superposed on the object beam, and a detector array which measures the spectral intensities of the interferogram in the different phase values of the reference light. This will be described more fully in the following with reference to the drawings.

BRIEF DESCRIPTION OF THE DRAWINGS

In the drawings, the following reference numbers are used.

1 temporally short coherent, spatially fully coherent light source
2 beam splitter
3 measurement beam
4 reference beam
5 rotatable deflecting mirror
6 focusing optics
7 object
8 dispersion prism
9 spectrometer optics
10 detector array
11 reference mirror
12 piezo-adjuster (including control electronics)
13 computer
14 mirror prism
15 roof prism
16 deflecting mirror
17 deflecting mirror

DESCRIPTION OF THE PREFERRED EMBODIMENTS

Figure 1:
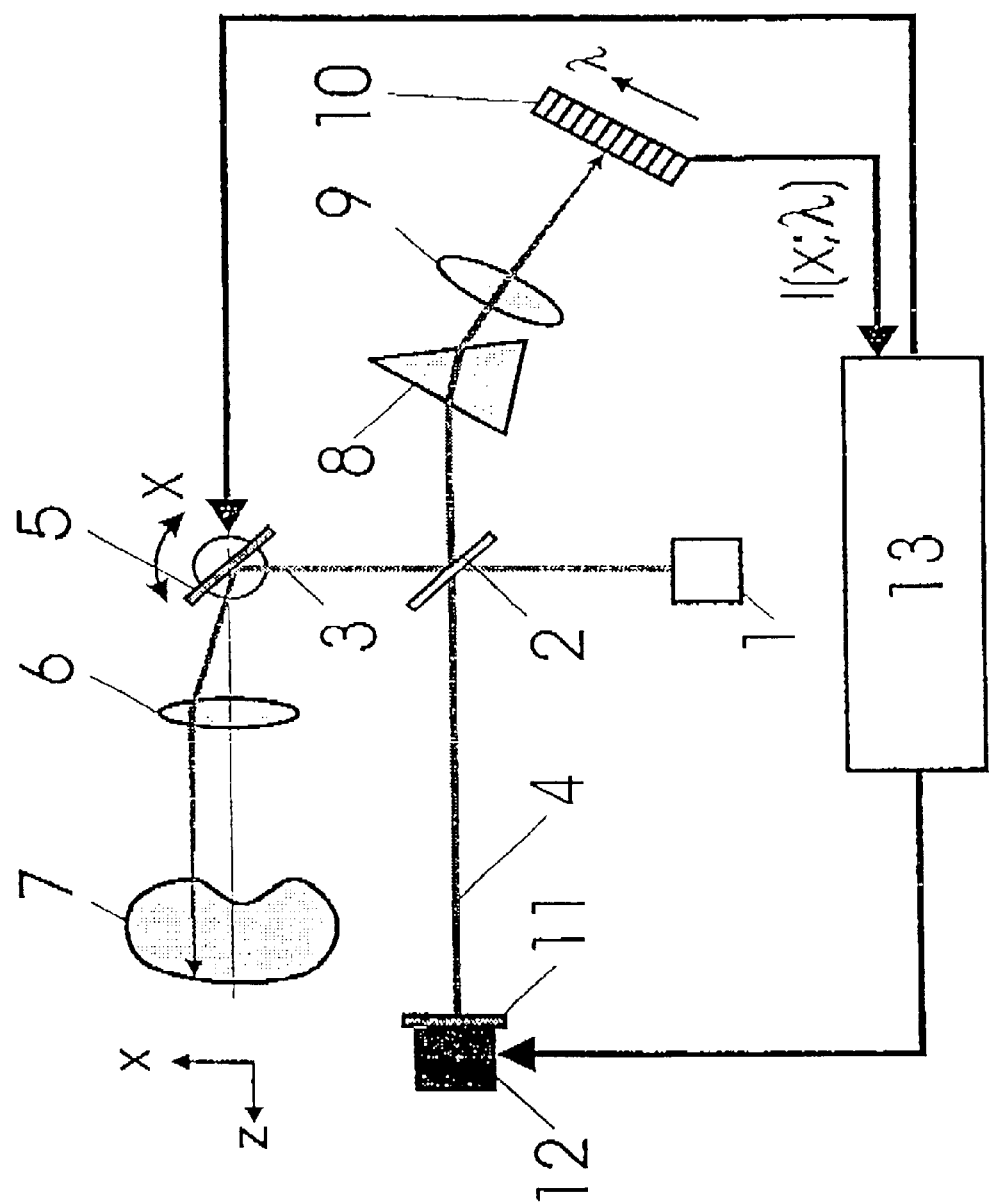
FIG. 1 is a schematic diagram of the arrangement of the present invention.

The arrangement according to the invention is shown in FIG. 1. A temporally short coherent, but spatially fully coherent light source 1, for example, a superluminescent diode, serves as a light source. The light beam emitted by the latter is divided by a splitter mirror 2 into a measurement beam 3 and a reference beam 4. The measurement beam 3 is directed from the rotatable deflecting mirror 5 to the optics 6 and focused by the latter onto the measurement object 7. The light diffusely reflected by the measurement object travels back over the optics 6 and deflecting mirror 5 to the splitter mirror 2 and is directed by the latter to the interferometer output. At the interferometer output there is a spectral photometer comprising a dispersion prism (or, alternatively, diffraction grating) 8, spectrometer optics 9 and detector array 10. Without the reference light, the spectral photometer records the light intensity diffusely reflected at the beam position x from the entire illuminated object depth as a function of the wavelength $\lambda$: I(x, $\lambda$).

The reference light bundle 4 is reflected by the reference mirror 11 and passes through the beam splitter 2, likewise at the interferometer output, to the spectrometer comprising dispersion prism 8, spectrometer optics 9 and detector array 10. The phase P of the reference beam 4 reflected at the reference mirror 11 can be changed in discrete steps by displacement of the reference mirror 11 by means of a piezo-adjuster 12. It is noted that the reference mirror 11 can and should preferably be erected at roughly the same optical distance from the beam splitter 2 as the object 7. The above-described increase in spatial frequencies in the spectrum to be resolved by the detector array 10 is then avoided.

The functioning of the arrangement according to the invention will be described in the following with a phase measurement process of digital interferometry known from the literature. There are several such methods, some of which are described in the above-cited textbook, "Optical Interferometry". There are also several technical possibilities for technical realization of the discrete phase steps in the reference arm, for example, based on polarization optics or by means of piezoelectric adjusting elements. This is all part of the known prior art and will not be discussed more fully herein.

Three discrete settings or adjustments of the reference mirror can be used for phase measurement, for example, by displacing the reference mirror along the beam axis by means of the piezoelectric adjuster 12 (all of the following are carried out in the same measurement beam position x):

(1) The first adjustment can be the rest position of the piezo-adjuster 12. This adjustment can be associated with phase value P=0 (since it only has to do with the phase differences of the three adjustments). The detector array 10 of the spectrometer (at beam position x and wavelength $\lambda$) gives the intensities I(x; P=0; $\lambda$).

(2) The second adjustment is carried out after displacement of the reference mirror by $\lambda/8$, which amounts to a phase displacement of P=$\pi/2$ due to the fact that the light passes through this additional path twice. The detector array 10 of the spectrometer now gives the intensities I(x; P=$\pi/2$; $\lambda$).

(3) Finally, after a further displacement of the reference mirror by $\pi/8$, another measurement is carried out at P=$\pi$:

$$I(x; P=\pi;\lambda).$$

These three measurements give the phase $\phi(x; \lambda)$ of the object wave:

$$\phi(x; \lambda)=\arctan\{[2 \cdot I(x;\pi/2;\pi)-I(x;0;\lambda) -I(x;\pi;\lambda)]/[I(x;\pi;\lambda)-I(x;0;\lambda)]\}.$$

Finally, the intensity I(x;$\lambda$) gives the amplitude A(x;$\lambda$):

$$A(x;\lambda)=\sqrt{I(x;\lambda)}, \text{ where } I(x;\lambda)=\tfrac{1}{2} \cdot [I(x;0;\lambda)+I(x;\pi;\lambda)].$$

There is accordingly spectral amplitude A(x;$\lambda$) and spectral phase $\phi$(x;$\lambda$) of the diffusely reflected light for calculating the scattering potential F(x;z) along the measurement beam in position x:

$$F(x;z)=FT\{A(x;\lambda) \cdot \exp(i \cdot \phi(x;\lambda)\}.$$

The tomogram F(x;z) is compiled from many such measurements at different values of x by means of a computer 13.

Figure 2:
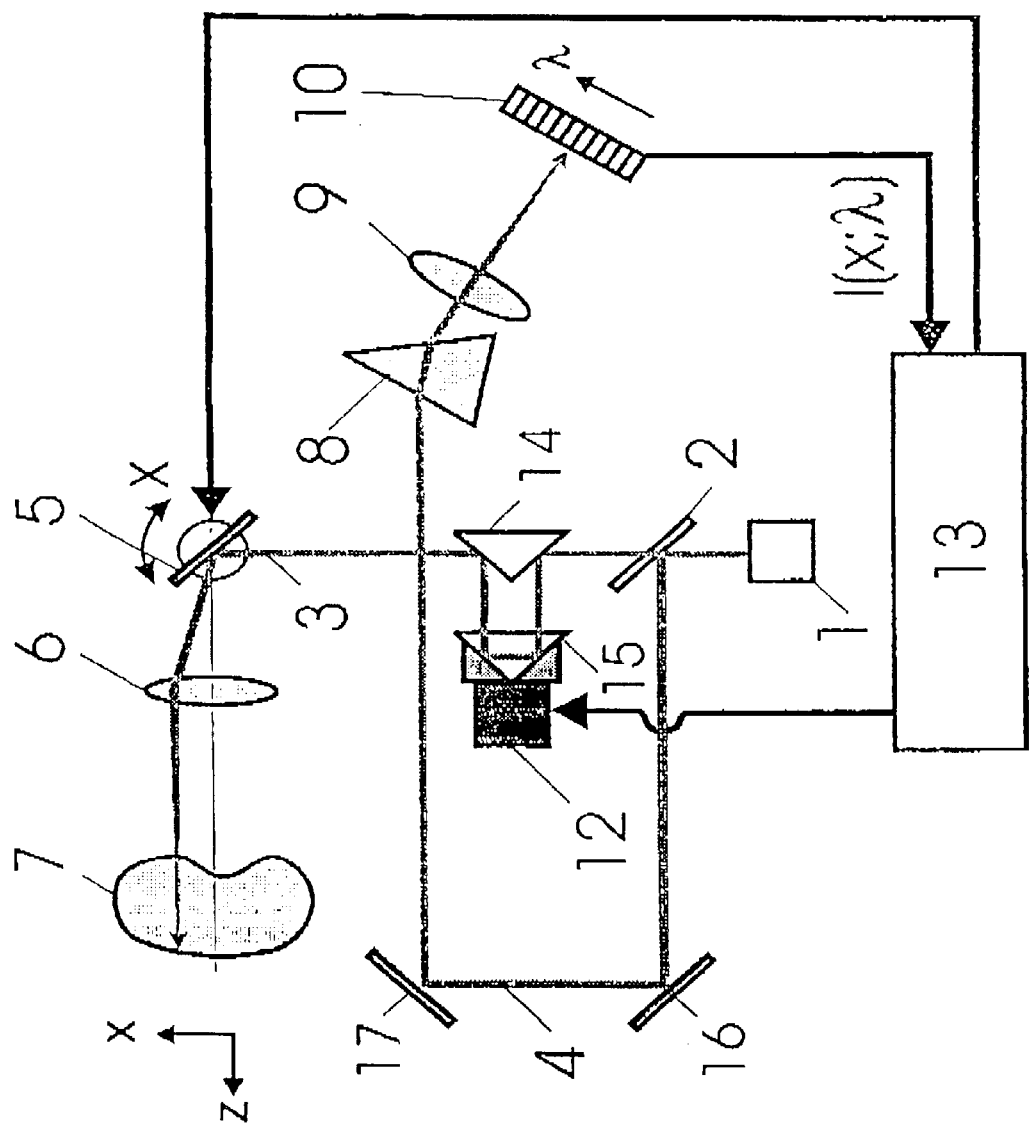
FIG. 2 is a schematic diagram of another embodiment of the arrangement of the present invention.

Finally, it is also noted that this phase measurement only has to do with relative phase differences between measured light and reference light. Therefore, the phase of the reference light can just as easily be left unchanged and the required discrete phase displacements carried out at the measurement light either before or after it impinges on the object. FIG. 2 shows an arrangement in which the measurement beam is initially directed from a mirror prism 14 to the roof prism 15 and back from the latter to the mirror prism 14. The further progress of the measurement beam corresponds to that shown in FIG. 1. The roof prism is mounted on a piezo-adjuster by means of which the discrete phase displacements required for the phase measurement are now carried out in the object light. The reference light bundle 4 is directed from the beam splitter mirror 2 via the deflecting mirrors 16 and 17 to the spectrometer.

It is also possible that, according to the invention, the relative phase difference between the measurement light and the reference light is changed in that an arrangement which changes the phase of the measurement light bundle or reference bundle in steps by discrete values is provided in the measurement light arm or in the reference arm.

For the sake of completeness, it is noted that while no tomograms can be taken with this method in the case of opaque objects, topographical surface profiles can be taken.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for optical coherence tomography and coherence topography comprising:

an interferometer having a measurement arm which scans the object by a rotatable deflecting mirror;

a reference mirror being arranged in a reference arm of the interferometer;

said interferometer having an output wherein light intensity occurring at said output by interference of the light bundles from the measurement arm and reference arm is analyzed by a spectrometer; and a device which changes the phase of the reference light bundle or the measurement light bundle by discrete values by steps.

* * * * *